United States Patent Office 3,051,714
Patented Aug. 28, 1962

3,051,714
4-(1,2,3,4, TETRAHYDROISOQUINOLINO)-2-BUTYN-1-OL
John H. Biel, Milwaukee, Wis., assignor to Lakeside Laboratories, Inc., Milwaukee, Wis., a corporation of Delaware
No Drawing. Filed Feb. 6, 1958, Ser. No. 713,549
1 Claim. (Cl. 260—289)

This invention relates to alkynols. More particularly, this invention is concerned with the production of novel cyclicaminoalkynols.

This application is a continuation-in-part application of my copending application Serial No. 620,165, filed November 5, 1956, now Patent No. 2,867,619, issued January 6, 1959.

According to this invention there are provided novel cyclicaminoalkynols of the formula

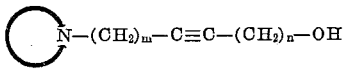

wherein $m$ and $n$ are the same or different integers, especially from 1 through 5, and

is a cyclicamino group, such as morpholino, pyrrolidino, piperidino, 1,2,3,4-tetrahydroisoquinolino, 1,2,3,4-tetrahydroquinolino, isoindolino, 4-lower alkyl piperazino, indolino, theophyllino and phenothiazino, and quaternary salts and acid addition salts thereof.

These compounds may be produced, as the tertiary bases, by reacting an appropriate haloalkynol of the formula $$X—(CH_2)_m—C\equiv C—(CH_2)_n—OH$$

with an appropriate cyclic secondary amine of the formula

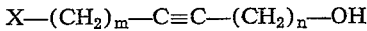

to produce the cyclicaminoalkynol of the formula

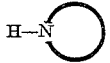

wherein X is a reactive halogen such as bromine or chlorine, and $m$, $n$ and

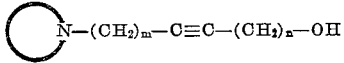

have the significance previously assigned.

Some haloalkynols which may be used in this process are 4-chloro-2-butyn-1-ol, 6-bromo-3-hexyn-1-ol, 8-chloro-4-octyn-1-ol and 5-chloro-2-pentyn-1-ol.

Included within the group of cyclicamines that may be used in the process are morpholine, piperidine, pyrrolidine, 1,2,3,4-tetrahydroisoquinoline, 1,2,3,4-tetrahydroquinoline, isoindoline, 4-methyl-piperazine, indoline, theophylline and phenothiazine.

The cyclicaminoalkynols may be produced by reacting the haloalkynol with an excess of the cyclicamine in an inert solvent such as benzene. The reaction mixture is cooled during the initial exothermic reaction. A secondary amine hydrohalide forms and is separated by filtration and the filtrate refluxed to complete the reaction. The product is recovered by fractionally distilling the clarified reaction mixture.

Some of the cyclic aminoalkynols so produced are 4-pyrrolidino-2-butyn-1-ol, 4-morpholino-2-butyn-1-ol, 4-piperidino-2-butyn-1-ol, 6-morpholino-3-hexyn-1-ol, 7-piperidino-2-heptyn-1-ol, 8-pyrrolidino-4-octyn-1-ol, 4-(1,2,3,4-tetrahydroisoquinolino)-2-butyn-1-ol, 4-(N-methylpiperazino)-2-butyn-1-ol, 6-(1,2,3,4-tetrahydroquinolino)-3-hexyn-1-ol, 8-isoindolino-2-octyn-1-ol, 5-phenothiazino-2-pentyn-1-ol, 7-pyrrolidino-3-heptyn-1-ol, 6-piperidino-3-hexyn-1-ol and the like.

Acid addition salts are produced by contacting such compounds with a suitable acid such as a mineral acid like sulfuric acid or hydrochloric acid, or an organic acid such as formic acid, citric acid, maleic acid or fumaric acid.

Quaternary ammonium salts of the cyclicaminoalkynols are formed by contacting such a tertiary amine with an alkylating agent, preferably in the presence of a suitable organic solvent. Alkylating agents such as lower alkyl halides, including methyl chloride, ethyl bromide, methyl bromide, alkylating agents like methyl and ethyl sulphate as well as aryl substituted alkylating agents like o-chlorobenzyl bromide, phenethyl chloride and phenylpropyl bromide are representative compounds which may be used to form quaternary ammonium salts of these tertiary bases.

The cyclicaminoalkynols are useful intermediates in the preparation of cyclicaminoalkynyl esters of N-substituted piperidine carboxylic acids which are useful hypotensive compounds as is shown in my copending application Serial No. 620,165, filed November 5, 1956, now Patent No. 2,867,619, issued January 6, 1959. The cyclicaminoalkynols also form useful esters with penicillin. They may also be used to neutralize acids in various solutions. The cyclicaminoalkynols form esters with acids of many types. These compounds may be partially reduced to the corresponding double bond derivatives and fully reduced to the saturated compounds.

The following examples are presented to illustrate the preparation of specific cyclicaminoalkynols within the scope and contemplation of the invention.

EXAMPLE 1

*4-Piperidino-2-Butyn-1-Ol*

To a solution of 127.5 g. of piperidine (1.5 M) in 200 cc. of benzene is added, in dropwise fashion, a solution of 62.7 g. of 4-chloro-2-butyn-1-ol (0.6 M) in 120 cc. of benzene. The mixture is refluxed for 3 hours. The precipitated piperidine hydrochloride is filtered off, washed with benzene, and benzene removed from the combined filtrates by vacuum distillation through a 14" Vigreux column. The residue is distilled through a 5" Vigreux column; B.P. 102–104° C. (0.45 mm.), $N_D^{25}$ 1.5076, yield 71.7 g. (78.1%).

*Analysis.*—Calcd. for $C_9H_{15}ON$: N, 9.14. Found: N, 9.55.

The hydrochloride salt melted at 140–143° C.

*Analysis.*—Calcd. for $C_9H_{16}ClNO$: Cl, 18.70. Found: Cl, 18.97.

EXAMPLE 2

*4-(1,2,3,4-Tetrahydroisoquinoline)-2-Butyn-1-Ol*

In a manner similar to Example 1 a solution of 166.3 g. of 1,2,3,4-tetrahydroisoquinoline (1.25 M) in 200 cc. of benzene is reacted with a solution of 52.3 g. of 4-chloro-2-butyn-1-ol (0.5 M) in 120 cc. of benzene. The residue is distilled through a 3" Vigreux column; B.P. 154–156° C. (0.3 mm.), $N_D^{25}$ 1.5759, yield 28.5 g. (28.4%).

*Analysis.*—Calcd. for $C_{13}H_{15}ON$: N, 6.96. Found: N, 6.96.

EXAMPLE 3

4-(N-Methyl Piperazino)-2-Butyn-1-Ol

In a manner similar to Example 1 a solution of 183.0 g. of N-methyl piperazine (1.83 M) in 240 cc. of benzene is reacted with a solution of 76.5 g. of 4-chloro-2-butyn-1-ol (0.73 M) in 145 cc. of benzene. The residue is distilled through a 5″ Vigreux column; B.P. 104–106° C. (0.1 mm.), $N_D^{25}$ 1.5124, yield 63.9 g. (52.1%).

*Analysis.*—Calcd. for $C_9H_{16}ON_2$: N, 16.65. Found: N, 16.97.

EXAMPLE 4

4-Morpholino-2-Butyn-1-Ol

Into a 500 cc. 3-neck round bottom flask equipped with stirrer, reflux condenser ($CaCl_2$ tube), addition funnel, and heating mantle is placed a solution of 87.0 g. morpholine (1.0 M) in 135 cc. benzene. In a rapid dropwise fashion a solution of 41.8 g. 4-chloro-2-butyn-1-ol (0.4 M) in 75 cc. benzene is added; a vigorous exothermic reaction occurs accompanied by separation of morpholine hydrochloride. The mixture is heated to reflux for 3 hrs. After cooling to room temperature, the crystalline morpholine hydrochloride is filtered off, washed well on the filter with benzene, and the combined benzene filtrates concentrated by vacuum distillation through a 14″ column. The residue is subjected to vacuum distillation through a 5″ column. The desired amino alcohol distills as a viscous oil, B.P. 104–106°/0.1 mm., $N_D^{25}=1.5087$, yield: 56.3 g. or 90.8% of theory.

*Analysis.*—Calcd. for $C_6H_{13}O_2N$: N, 9.03%. Found: N, 9.18%.

Various changes and modifications of the invention can be made and, to the extent that such variations incorporate the spirit of this invention, they are intended to be included within the scope of the appended claim.

What is claimed is:

4-(1,2,3,4-tetrahydroisoquinolino)-2-butyn-1-ol.

References Cited in the file of this patent

UNITED STATES PATENTS

| | | |
|---|---|---|
| 2,613,208 | Van Hook et al. | Oct. 7, 1952 |
| 2,769,008 | Reppe | Oct. 30, 1956 |
| 2,782,191 | Reppe | Feb. 19, 1957 |
| 2,867,619 | Biel | Jan. 6, 1959 |

FOREIGN PATENTS

| | | |
|---|---|---|
| 1,024,773 | Germany | Feb. 20, 1958 |

OTHER REFERENCES

Epsztein et al.: Bull. Soc. Chim (France), 1953, pages 952–6.

Colonge et al.: Bull. Soc. Chim (France), 1955, pages 502–3.

Reppe et al.: Justus Liebigs Annalen der Chemie, Band 596, page 30 (1955).

UNITED STATES PATENT OFFICE
CERTIFICATE OF CORRECTION

Patent No. 3,051,714                                     August 28, 1962

John H. Biel

It is hereby certified that error appears in the above numbered patent requiring correction and that the said Letters Patent should read as corrected below.

Column 2, lines 42 and 61, and column 3, lines 3 and 14, in the titles of Examples 1 to 4, for "Ol", each occurrence, in italics, read -- ol --, in italics.

Signed and sealed this 18th day of December 1962.

(SEAL)
Attest:

ERNEST W. SWIDER                                           DAVID L. LADD
Attesting Officer                                                Commissioner of Patents